United States Patent Office 3,457,403
Patented July 22, 1969

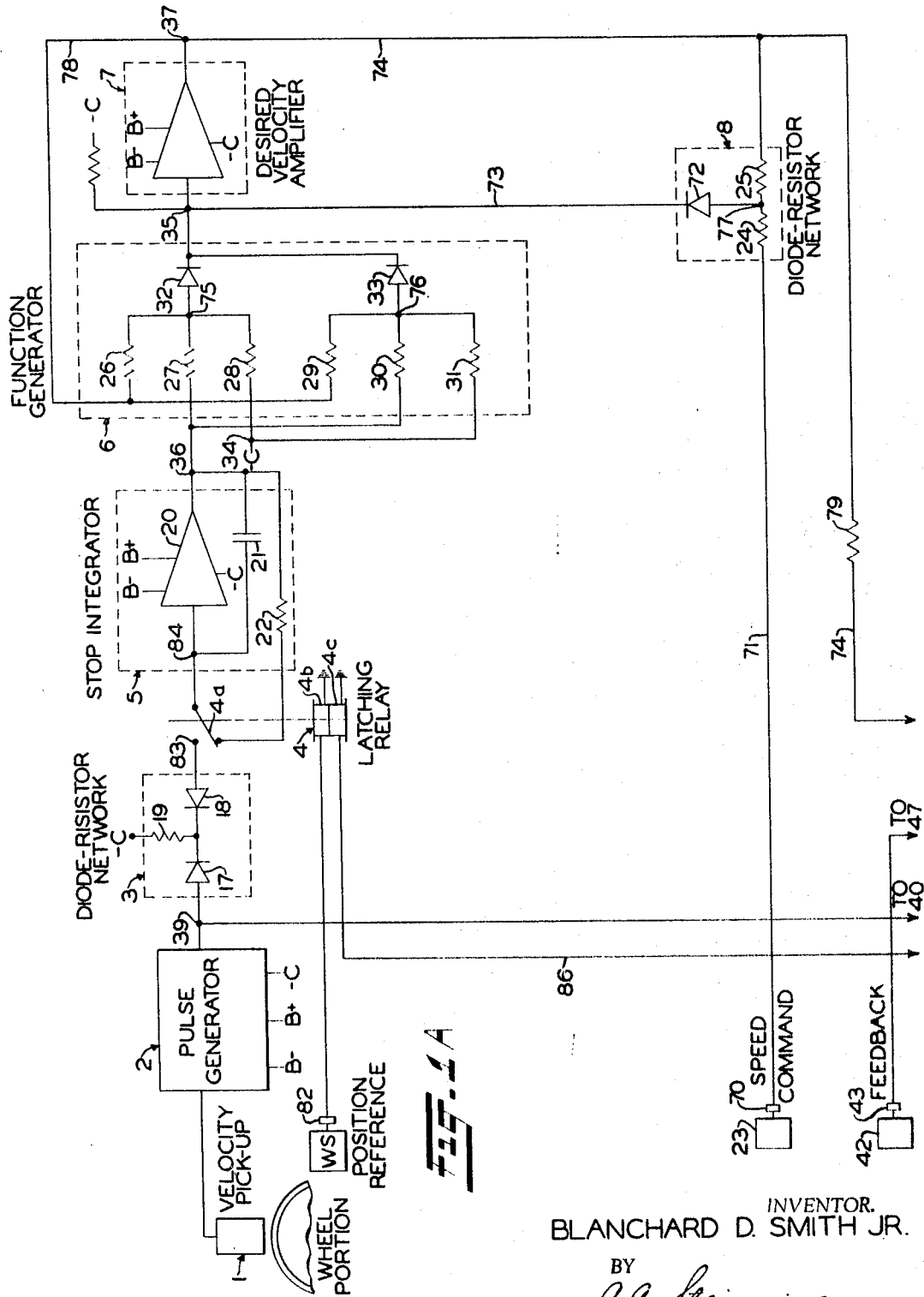

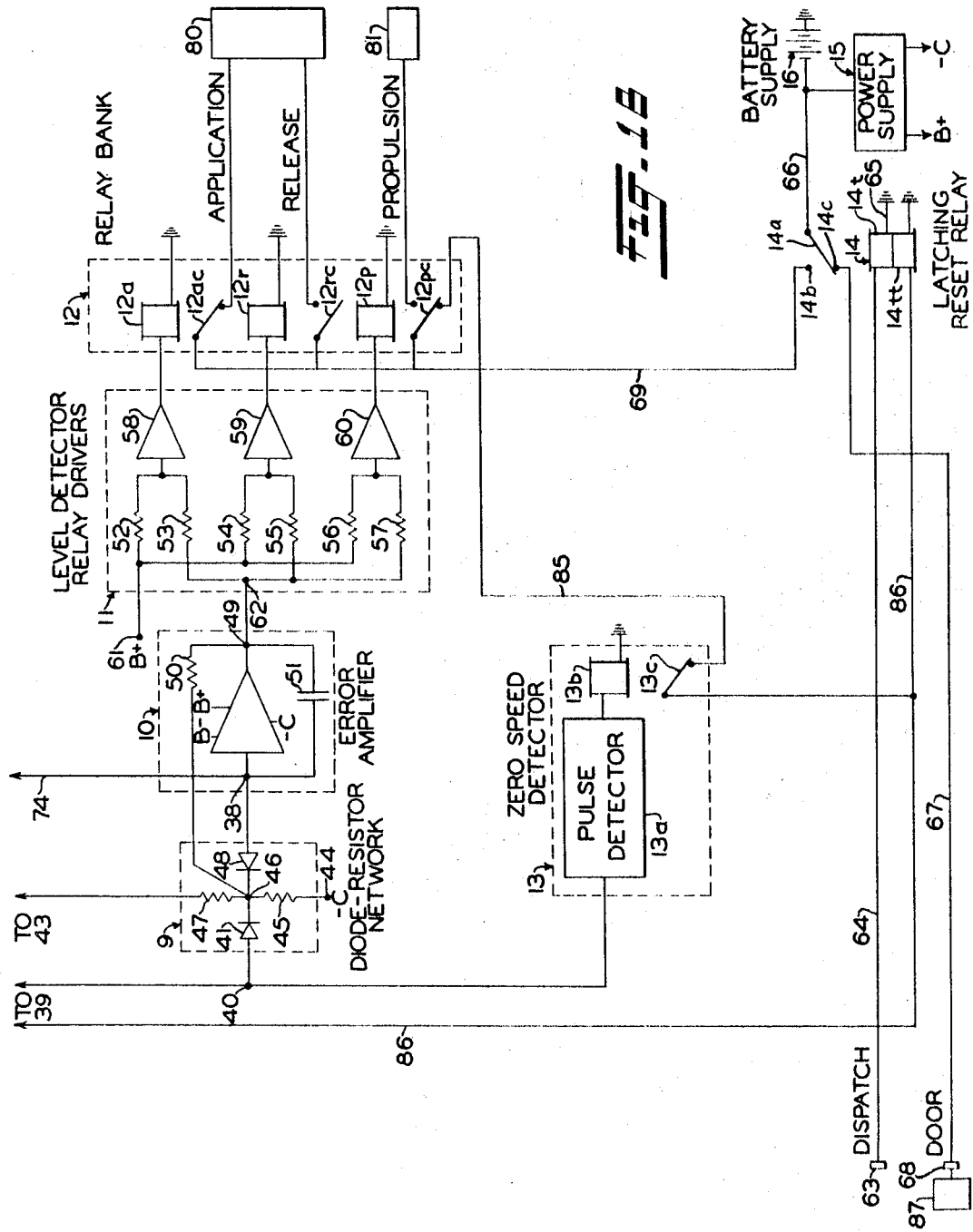

3,457,403
MOTION CONTROL SYSTEM FOR RAPID TRANSIT VEHICLES
Blanchard D. Smith, Jr., Alexandria, Va., assignor to Westinghouse Air Brake Company, Wilmerding, Pa., a corporation of Pennsylvania
Filed Feb. 15, 1966, Ser. No. 527,594
Int. Cl. B61l 3/08, 3/18, 3/06
U.S. Cl. 246—187                17 Claims

ABSTRACT OF THE DISCLOSURE

A velocity or speed control apparatus for automatically controlling the propulsion and braking of a railway train by utilizing a cybernetic modcule in the form of electronic analog computing circuitry to compare the actual train velocity with either a speed command from wayside signals under normal running conditions and a wayside initiated desired-velocity stopping profile computed as a function of distance traveled from a reference point along the track prior to entering a station under stopping conditions. The electronic analog computing circuitry utilizes a precision pulse generator circuitry, a diode-resistor network, a transducer controlled brake level control circuit, and diode-logic circuitry in combination with velocity-error loop circuitry to provide a logic signal for controlling train velocity through use of brake application and release control relays and propulsion control relays.

Figure 2:
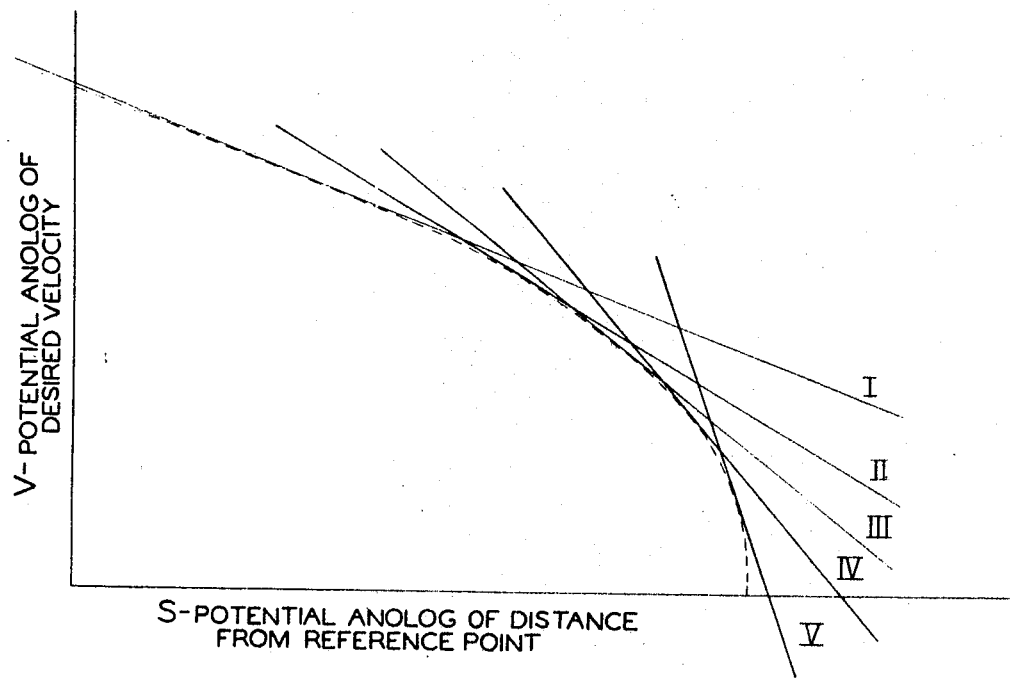

Automatic propulsion and braking controls for controlling subway or rapid transit trains responsively to externally-derived signals have been known for some time. Such control systems have employed controls for propulsion and braking which operate in an off-on manner, with the consequent result of jerky motion, particularly during deceleration incident to coming to a stop. Such known controls also are characterized by poor stopping accuracy, that is, inability to stop the train uniformly within a given limited range of a given stopping point, such inability arising partly out of variations in passenger load as well as speed of entry into the stopping zone.

It is accordingly an object of this invention to provide a motion control system for automatically controlling positive traction or propulsion power and negative traction or braking of a rapid transit vehicle in response to both wayside signals and track signals in a manner to maintain constant positive control of the velocity or speed of the vehicle suited to the terrain, to maintain smooth motion while in transit between stations and for effecting smooth deceleration according to a desired speed profile for obtaining precision stopping at a station.

According to the present invention, there is provided a novel velocity or speed control apparatus for automatically controlling the propulsion and braking of a railway train, such as a rapid transit commuter train, by utilizing a cybernetic module in the form of electronic analog computing circuitry which compares the actual train velocity as derived from a magnetic pickup or an axle generator associated with a vehicle wheel, with speed commands as derived from the wayside or track circuit signals, and with a desired-velocity stopping profile computed as a function of distance traveled from a position reference point along the track prior to entering a station. The electronic analog computing technique is accomplished by the use of precision pulse generation and analog integration of velocity to obtain a distance profile, the use of diode-resistor networks to develop the desired stopping profile, the use of a feedback signal proportional to braking level to provide continuous braking level control, use of diode-logic to combine speed commands and the stopping profile into one desired-velocity signal, and the use of variable gain in the velocity-error loop circuitry to provide a logic signal for controlling train velocity.

In the accompanying drawings:
FIGS. 1A and 1B, taken together, show a schematic diagram of the automatic velocity control programming apparatus for railway trains.
FIG. 2 is a graph, showing a stopping profile curve and the line segments of potential which in summation produce the desired stopping profile.

Description

As shown in FIG. 1 the motion control programmer includes the following elements, each discussed further hereinafter: (a) velocity pickup 1, (b) pulse generator 2, (c) diode-resistor network 3, (d) latching relay 4 with contact member 4a, (e) stop integrator 5, (f) function generator 6, (g) desired-velocity amplifier 7, (h) diode-resistor network 8, (i) diode-resistor network 9, (j) error amplifier 10, (k) level-detector relay devices 11, (l) relay bank 12 including a brake application relay 12a, brake release relay 12r, and propulsion relay 12p, (m) zero speed detector 13 including a pulse detector 13a and a slow release relay 13b with a contact member 13c, (n) latching reset relay 14 with contact member 14a, (o) power supply 15, and (p) source of energy such as a battery 16.

The velocity pick-up 1 is a well-known device operating on the principle of an axle-driven gear-tooth passing through a magnetic field to cause generation of an AC voltage, the frequency of which is proportional to rotational velocity of the gear which in turn is proportional to the velocity of the train. In that the velocity pick-up is well known, it is shown herein simply as a box 1 associated with a portion of a vehicle wheel.

The current pulses supplied by the velocity pick-up 1 vary in amplitude and pulse width and therefore cannot effectively be applied directly to velocity control circuitry, but must be delivered to a pulse generator 2 for regulation and modification thereof as hereinafter explained.

The pulse generator 2 is essentially a triggered shaper of a well-known type including an A-C amplifier, well-known Schmitt-trigger circuit, and a one-shot multivibrator, all shown in FIG. 1 as a box 2 for simplicity of description. The pulse generator 2 is supplied with a negative voltage —C and a positive voltage B+ with a ground lead B— in a usual well-known manner. The output of the velocity pick-up is supplied to the pulse generator 2 to act as a trigger to cause the pulse generator 2 to produce a series of negative pulses of uniform amplitude and width at a frequency corresponding to that of the input, which frequency in turn corresponds to the actual vehicle velocity.

The diode-resistor network 3 includes two diodes 17 and 18 and a resistor 19 connected therebetween to a supply of negative voltage.

The latching relay 4 is the normal latch type relay having two windings 4b and 4c energized selectively one at a time, one of which (4b) is energized to move a contact member 4a thereof into one position and the other of which (4c) is energized to move the contact member 4a to a second position, said contact member 4a remaining in the one position or the second position until the opposite winding is energized to move it to the other position.

The stop integrator 5 includes a well-known operational amplifier 20, of high negative gain, having a negative voltage supply —C, a positive voltage supply B+ and a ground B— in parallel with a capacitor 21 and a resistor 22 to operate as an analog integrator to produce an analog output voltage. The operation of operational amplifiers as integrators is well known and for simplicity is not described herein, however, if a detailed desecription is desired, it may be obtained from the Clarence Johnson book, "Analog Computer Techniques," or the book, "Electronic Analog Computers," of Korn and Korn both published by McGraw-Hill Book Company. Basically when contact member 4a connects terminals 83 and 84 the integrator 5 receives a signal from the pulse generator 2 and begins measuring distance travelled by producing a positive analog output voltage which is an integral of the velocity output of the pulse generator 2 and which is used to generate the stopping profile. When contact member 4a connects terminal 84 and resistor 22, the integrator is reset by discharging capacitor 21. The integrator 5 is set in operation by the latching relay 4 at a predetermined reference point approaching a station by a wayside signal means WS (for simplicity shown in block form) and when the train reaches the terminal point at the end of a precision stop, explained in further detail hereinafter under "Operation," another signal from the wayside signal means effects removal of the pulse generator input and resetting of the integrator in a well-known manner.

The function generator 6 and the desired-velocity amplifier 7 operate cooperatively, utilizing the feedback of the desired-velocity amplifier 7, as explained hereinafter.

The desired-velocity amplifier 7 is a standard silicon, chopper-stabilized, operational amplifier of high negative gain that will meet a very wide operational temperature requirement. This amplifier 7 is powered in the usual manner by circuitry, including a negative supply —C, a positive supply B+ and a ground B—, all of which are indicated within the block in broken lines indicated by reference numeral 7. An additional negative reference voltage —C is also utilized as an input to the amplifier 7, and is shown as connected via a biasing resistor R at the terminal point 35. Another source of input is effected by track circuit signals of usual train control or "cab signal" type continuously feeding a speed command signal in the form of a negative "speed-limit analog voltage" via a usual well-known pick-up device 23 to the diode-resistor network 8 and thence to the input of the desired-velocity amplifier 7. When operating in a stopping profile after receiving signals at a position reference point, the "distance-travelled analog voltage" generated by the integrator 5 is also supplied via the function generator 6 to the input of the desired-velocity amplifier 7. The function of the desired-velocity amplifier 7 and diodes 32, 33 and 72 is to select either the "speed-limit analog voltage" input or the "distance-travelled analog voltage" input as modified by the function generator 6. The lowest voltage input is selected as will be explained hereinafter under "Operation." When not governed by the stopping profile, the desired-velocity amplifier 7 functions as an inverting amplifier using an input resistor 24 and a feedback resistor 25 of the resistor diode network 8. When governed by the stopping profile, the input is taken from function generator 6. The effective gain of the desired-velocity amplifier in this instance would then be controlled by the feedback resistors or combinations thereof in the function generator 6 circuitry.

The function generator 6 includes the resistors 26, 27, 28, 29, 30, 31 (26 and 29 being feedback resistors) and diodes 32 and 33 to form a diode switching matrix to produce a two-segment precision stopping profile. Input to this matrix is supplied by outputs from integrator 5 and by feedback from the desired-velocity amplifier 7. It should be noted that only two diode and resistor groups (32, 26, 27, 28) and (33, 29, 30, 31) are shown herein but additional groups connected in parallel may be utilized in the function generator 6 to produce desired stopping profiles, having three, four, or an arbitrarily large number of segments. The resistors of each of these groups are connected respectively to feedback of the desired-voltage amplifier 7, the output of the stop integrator 5, and a source of negative voltage at a terminal 34. When a speed command signal is produced at the pick-up 23 as the only signal, the diodes of the function generator matrix are reverse biased as explained hereinafter. When the matrix diodes are reverse biased, stopping profile data voltage or "distance-travelled analog voltage" is not applied to the input of the desired-velocity amplifier 7 at the input terminal 35. When an additional signal as an increasing voltage is received from the stop integrator output at terminal 36, it is applied to the function generator matrix along with a feedback voltage from the output terminal 37 of the desired-velocity amplifier 7. The two input voltages to the matrix are algebraically added with the negative reference voltage from the terminal 34 to successively forward bias the diodes 32 and 33 of the matrix to modify the input to amplifier 7. In this manner a "desired-velocity analog voltage" is generated at terminal 37. The analog voltage output of the desired-velocity amplifier 7 is applied to the input terminal 38 of an error amplifier 10 as described hereinafter.

The error amplifier 10 is an operational amplifier of high negative gain similar to the desired-velocity amplifier 7 having a negative supply —C, a positive supply B+ and a ground B—. The error amplifier 10 operates cooperatively with the diode-resistor network 9 to produce an analog voltage that is proportional to relative difference between desired velocity and actual velocity. This difference in analog voltage produces a resultant voltage which is applied to other elements, as explained hereinafter, to selectively effect a traction response of braking or propulsion which will tend to reduce the said difference and bring the actual velocity to the desired velocity, as explained under "Operation." Input signals are supplied by the output of the desired-velocity amplifier 7 (positive voltage from terminal 37), the output of the pulse generator (negative actual-velocity voltage from terminal 39 to the terminal 40 and a diode 41 of the diode-resistor network 9), and the modulating voltage of the usual brake feedback circuits which include a transducer and circuitry (not shown) connected in the usual straight-air pipe of the train to supply a negative voltage output proportional to the pressure in the straight-air pipe. In that the pressure established in the straight-air pipe is proportional to the desired or required braking pressure, it can be seen that the output of the transducer is proportional to existing braking pressure. For simplicity, the feedback circuitry and transducer is shown only as box 42. To adapt the pulse generator output to the error-amplifier input, the series of negative pulses of constant amplitude and duration whose frequency is proportional to actual velocity is applied at the terminal 40 to back-bias the diode 41 to allow the reference voltage (—C) at terminal 44 to become an input to a resistor 45 and terminal 46 of the diode-resistor network 9. The brake pressure feedback voltage is applied across a resistor 47 to the terminal 46. A diode 48 in the diode-resistor network 9 is rendered conducting or nonconducting alternately with the diode 41 in accordance with the pulses received from the pulse generator 2 as explained hereinafter. A resistor 50 is connected between the terminal 46 of the diode-resistor network 9 and the output terminal 49 of the error amplifier 10. A condenser 51 is connected across the input terminal 38 and output terminal 49 of the error amplifier to filter pulse components.

The level detector relay driver circuit comprises a plurality of resistor-amplifier-relay combinations to form a plurality of relay driver circuits, said combinations including selectively resistors 52, 53, 54, 56 and 57, voltage responsive amplifiers 58, 59 and 60 and the relays 12a, 12r and 12p of the relay bank 12. Positive voltage from a suitable source is supplied to this circuitry at a terminal 61 to combine with the negative voltage from the error amplifier at terminal 62 to selectively energize the voltage responsive amplifiers 58, 59 and 60 to effect selective energization of the relays 12a, 12r, and 12p to effect a desired traction control in a manner described hereinafter.

Operation

Assume the train or vehicle being controlled is initially at rest and is ready to proceed from a station. A dispatch signal is received from a manual source or automatic scheduling device (not shown) at a terminal 63 which is delivered via wire 64 to the top winding 14t of the latching relay 14 and thence to ground by wire 65 to cause the contact member 14a thereof to be moved to its upper closed position in engagement with terminal 14b to complete a relay potential circuit and simultaneously opening a door circuit at terminal 14c. Opening the door circuit, including a source of supply 16, wire 66, contact member 14a, wire 67 and terminal 68, effects operation of door signaling device (not shown) which effects closure of the vehicle doors in a well-known manner using a transmitter, an understanding of which is not necessary for an understanding of the present invention. Completion of the relay potential circuit supplies a potential from the source 16 via wire 66, contact member 14a and wire 69 to the various contact members 12ac, 12rc and 12 pc of the respective relays 12a, 12r and 12p for purposes described hereinafter.

Simultaneous with the receipt of the dispatch signal, a negative "speed-limit analog voltage" is received from a pickup device 23 at the terminal 70 and thence via wire 71 to the diode-resistor network 8 including a diode 72 and the resistors 24 and 25. Diode 72 is connected to the input terminal 35 of the desired-velocity amplifier 7 by wire 73 and resistor 25 is connected to the output terminal 37 thereof by the wire 74. The combination of this network, the diode-resistor network of the function generator 6 and the operational desired-velocity amplifier 7 comprise a circuit to develop a positive potential analog voltage of desired velocity at the output terminal 37 as explained herein.

The operation of the desired-velocity circuit is such that the output terminal 37 of the operational desired-velocity amplifier 7 assumes a potential that will make the input potential at terminal 35 always zero in a manner characteristic of operational amplifiers. At any particular operating condition due to the selected values of the resistors 26 through 31 in the function generator 6, there will be different potentials at the anode terminals 75 and 76 of the respective diodes 32 and 33 and at the anode terminal 77 of diode 72. Because of the forward conduction characteristic of these diodes, the input terminal 35 will assume a potential equal to the largest of the potential of the three mentioned diodes as is well known in this type of circuitry. If this potential at the input terminal 35 is a negative voltage, the potential at the output terminal 37 will increase in a positive direction causing current to flow via wire 78 through resistors 26 and 29 of the function generator 6 and resistor 25 of the resistor diode network 8 until the potential on the input terminal and across one of the diodes 32, 33 or 72 is zero in a characteristic manner of this circuitry. Initially with no velocity of the vehicle and with no position reference signal, the stop integrator 5 is not in the circuitry (as explained hereinafter) and therefore only the negative supply —C applied at terminal 34, and the negative command signal from terminal 70 combined with the feedback through the operational amplifier 7 is applied to the input terminal 35 such that the output terminal 37 is at its maximum positive potential as is characteristic of such amplifiers. The output voltage at terminal 37 is connected through a resistor 79 to the input terminal 38 of the error operational amplifier 10.

The error operational amplifier 10, its associated diode-resistor network 9, and the feedback resistor 50 and condenser 51 comprise circuitry to sense the velocity error. As just described, initially the output terminal 37 of the operational amplifier 7 is at its maximum positive potential, and thus the input terminal 38 of the operational amplifier 10 is at a maximum positive potential by way of wire 74. Therefore, as is characteristic of an operational amplifier, the potential at the output terminal 49 and terminal 62 will be driven to its negative limit. The terminal 62 of negative potential is connected to the resistors 53, 55 and 57 while the terminal 61 of positive potential is connected to resistors 52, 54 and 55 of the resistor network forming the input to the amplifiers 58, 59 and 60 which in turn operate when their input is negative to form relay driver circuits for energizing the relay 12a, 12r, and 12p selectively in accordance with the voltage supplied to said amplifiers. By chosing the right values of the resistors 52 through 57 it is possible to select the voltage supplied to the voltage responsive (Schmitt-triggered) amplifiers 58, 59 and 60. By choice of resistors 52 and 53, the amplifier 58 is permitted to operate to energize relay 12a at a small negative potential from terminals 49 and 62, such potential being an analog of the velocity error. Similarly, by choice of resistors 54 and 55 the amplifier 59 may be permitted to operate to energize relay 12r at a greater negative potential from the terminals 49 and 62 and by choice of resistors 56 and 57 the amplifier 60 may be permitted to operate to energize relay 12p at a still greater negative potential supplied from the terminals 49 and 62. It can thus be seen that by proper choice values of the resistors of the resistor network, the amplifiers 58, 59 and 60 are operated selectively in sequence to energize the relays 12a, 12r and 12p selectively in sequence as the potential from terminal 49 (the analog of velocity error) goes in a more negative direction and consequently the relays 12p, 12r and 12a are de-energized selectively in sequence as the potential at terminal 49 becomes less negative towards a positive direction. Under the present assumed condition of "ready to proceed" as was previously shown, the potential at the terminal 49 has been driven to its negative limit and therefore all three relays 12a, 12r and 12 p will be energized.

Relay 12a and its contact member 12ac is designed such that with said relay de-energized, the contact member 12ac completes circuitry to the usual pneumatic braking equipment shown herein as a box 80 to effect a brake application in the usual manner and when energized opens such circuitry to effect the usual so-called "lap" condition.

Relay 12r and its contact member 12rc is designed such that with said relay energized, the contact member 12rc completes circuitry to braking equipment 80 to effect a brake release in the usual manner.

Relay 12p and its contact member 12pc is designed such that when said relay is energized the contact member 12pc completes circuitry to the propulsion equipment 81 to effect tractive effort of the motors in the usual manner. Relay 12p when de-energized effects completion of other circuitry described hereinafter.

Initially, while the train is at rest the latching relay 14 is de-energized due to lack of any dispatch signal from the terminal 63. Thus, the contact member 14a thereof is in its down closed position thereby removing the potential from the wire 69 such that the circuitry via the contact member 12ac becomes de-energized to maintain a brake application regardless of the positioning of the contact member 12ac. When the displatch signal is received as hereinbefore explained, the potential from the battery supply 16 is supplied by the contact member 14a to the wire 69 such that the relays 12a, 12r, and 12p may perform their desired functions as explained hereinafter.

It can thus be seen that under the "ready to proceed" assumed condition with all the relays of the relay bank 12 energized as described, the braking equipment 80 effects release of the brakes and the propulsion equipment 81 moves the train out of the station.

In view of the above description it should be now seen the control of the tractive effort as braking effort lies in variation of the negative potential at the terminals 49 and 62 which is controlled as explained hereinafter.

In that the brakes are released there is no signal received from the feedback terminal 43, but there is a signal received at the speed command terminal 70 from the pick-up device 23, and as the train moves a signal is now received at the velocity pick-up 1.

As explained before, velocity pick-up 1 sends a signal to the pulse generator 2 which converts the signal to a series of negative pulses of constant amplitude and duration whose frequency is proportional to actual velocity. In between pulses or in the absence of a pulse the output of the pulse generator 2 is slightly positive as is a characteristic of this type of pulse generator utilized herein, and therefore the potential at terminals 39 and 40 is slightly positive such that the diode 41 conducts and the diode 48 is nonconducting. As each negative pulse is transmitted from the pulse generator 2 to the terminals 39 and 40, the diode 41 becomes nonconducting and diode 48 conducts such that current flows through the diode 48 to the input terminal 38 of the error amplifier 10 during each negative pulse from the pulse generator tending to cancel the positive desired-velocity analog voltage, which in turn modifies in a positive direction the output voltage analog at terminal 49 representative of an analog of velocity error.

As the actual velocity of the train increases, the point is reached where analog of velocity error or the voltage at terminal 49 departs from its negative limit due to the modifying effect of the increased pulse generator output proportional to actual velocity on the input terminal 38. As the voltage at terminal 49 becomes less negative it reaches a value where the amplifier 60 is no longer responsive and relay 12p becomes de-energized causing the contact member 12pc thereof to drop out of its upper closed position to interrupt the propulsion control circuitry to effect cessation of positive traction. With the cessation of positive traction, the actual velocity will normally begin to reduce. The reduction in velocity causes reduction of the output of the pulse generator 2 which in turn causes modification of the voltage at the terminal 38 to cause the output voltage at terminals 49 and 62 to increase in a negative direction until the amplifier 60 becomes effective to cause relay 12p to again be energized and picked up to complete the propulsion control circuitry and restore positive traction. It can thus be seen that the actual speed is maintained at or below the desired speed indicated by the command signal at terminal 70 by periodic applications of positive traction.

Should a lower speed command be given, such command would be in the form of a signal voltage at the terminal 70 of lesser negative value than that under the higher speed command. The lesser negative signal at terminal 70 alters the output of the amplifier 7 at terminal 37 to be less positive and thus the terminal 38 becomes less positive. With the lesser positive voltage at terminal 38, the output of the amplifier 10 becomes less negative such that the amplifiers 60, 59, and 58 become inoperative in sequential order such that first the relay 12p drops out to open the positive traction circuitry and end propulsion efforts, then the relay 12r drops out to open the brake release control circuitry and finally the relay 12a drops out to complete the brake application control circuitry to effect a brake application. As the degree of brake application, or so called brake level increases, a feedback signal of positive voltage is supplied to the feedback terminal 43 by the aforementioned transducer means in proportion to the braking pressure level. This feedback signal is supplied to the diode resistor network 9 to act as an increasing positive potential modulating voltage on the input terminal 38 of the amplifier 10 to result in an increase of the output voltage at terminal 49 in a negative direction. The increase in negative voltage at terminal 49 becomes sufficient to cause amplifier 58 to operate to effect pick-up of relay 12a to open the brake application circuitry to effect a lap condition of the brakes and prevent any further increase in braking pressure level.

As the actual train velocity reduces in the "lap condition" of braking, the negative voltage at terminal 39 decreases to ultimately effect a further increase in the negative direction of the voltage at terminal 49 until the amplifier 59 becomes operative to effect pickup of the relay 12r and consequent closing of the release control circuitry to cause release of the brakes. In this situation, the vehicle is in a so-called "coast" condition.

After a period of coasting, the actual train velocity becomes lower than the command speed, at which time the voltage on the terminal 49 has increased in a negative direction sufficiently to operate amplifier 60 to effect pickup of relay 12p and consequently cause positive traction to be applied and maintained applied in periodic efforts, as before described, to maintain the vehicle velocity at or slightly below the command speed.

Stop from position reference point

At a point which is a predetermined distance from a desired station stop, which point is hereinafter referred to as a position reference point, the train passes by an induction coil placed between the track rails which functions cooperatively with a frequency generator and associated circuitry on the train (shown only as box WS) to cause a signal to be generated thereon and transmitted to a position reference terminal 82. The signal voltage from terminal 82 is supplied to the top winding 4b of the latching relay 4 to energize said relay and pickup the contact member 4a thereof to connect the terminal 83 of the diode 18 in the diode-resistor network 3 to the input terminal 84 of the operational amplifier 20 in the stop integrator 5.

The diode-resistor network operates characteristically such that during the interval between the negative pulses from the pulse generator 2, the potential at terminal 39 is slightly positive such that diode 17 conducts and diode 18 is nonconducting. In response to the negative pulses from the pulse generator 2, the diode 17 becomes nonconducting and diode 18 conducts to permit a negative voltage supply —C through resistor 19 to the input terminal 84 and thereby cause the potential on the output terminal 36 to become increasingly positive with the increased rate of pulses from the pulse generator 2, due to the integration operation.

The values of the resistors 26, 27, 28, 29, 30 and 31 of the function generator are selected such that when this positive potential at terminal 36 reaches a predetermined level in cooperation with the positive feedback voltage from the desired-velocity amplifier 7, one of the diodes 32 or 33 becomes selectively conductive to effect modification of the negative reference voltage —C connected via biasing resistor R at terminal 35 in accordance with the variation of output potential at terminal 36 and the selected values of the resistors 28 and 31.

It can thus be seen that by choosing predetermined values of resistors of the resistor-diode groups (only two groups being shown herein), different corresponding line segments (I and II of FIG. 2) of successively increasing slope are obtained, which in composite, closely approximates a desired stopping profile. FIG. 2 is a graph of potential V at terminal 37 (potential analog of desired velocity) versus potential S at terminal 36 (potential analog of distance from position reference point).

Any desired number of additional resistor-diode groups may be added in parallel with the two shown in FIG. 1A and, by choosing appropriate values of the resistors in the different sets, different line segments, such as line segments III, IV and V as shown in FIG. 2 may be obtained, which in summation with line segments I and II result in the curve shown in a broken line in FIG. 2, representative of a precision stopping profile.

Characteristic of the diode-resistor networks supplying the input terminal 35, only one of the diodes 32, 33 and 72 will normally conduct, namely that one having the least negative potential at its anode terminal. Thus, if the lesser negative potential is supplied via the diode 72, said negative potential being proportional to the command signal at terminal 70, the output of the amplifier 7 (which is a potential analog of desired velocity) will be a positive potential proportional to the command signal and therefore in this case is a potential analog of command speed.

If the conducting diode is either 32 or 33, the input potential at terminal 35 is a weighted sum of the potentials supplied at terminals 36, 37, and 34. The operational amplifier 7 is driven until the potential at terminal 35 is zero, with the result that the desired-velocity potential V at terminal 37 is a function of distance travelled corresponding to one of the line segments I, II, etc. of FIG. 2. As a result of the diodes and resistor values in each resistor-diode group of the function generator 6, the potential V at the terminal 37 at any particular time lies on only one of the lines I, II, etc. of FIG. 2, and in particular the one resulting in the least positive value. Thus, the potential analog of desired velocity on terminal 37 is the lesser of either (a) the potential analog of command speed as derived from the signal at terminal 70, or (b) any one of the line segments representing a desired stopping profile versus the potential analog of distance at the terminal 36.

As seen from FIG. 2, initially the potential analog of distance is zero and the terminal voltage V at terminal 37 is of positive potential. As previously described, the positive potential output V at terminal 37 is supplied to terminal 38 of the error-amplifier 10 to result in a negative potential output thereof at terminal 49 to control the energization of the amplifiers 58, 59 and 60 in accordance with the value of the voltage, such that as the output potential V at terminal 37 becomes less positive, the output potential at terminal 49 becomes less negative to effect sequential operation of the relays 60, 59 and 58 as previously explained, to maintain traction and braking control in accordance with the stopping profiles selected to thereby bring the train to a precision stop in the station. The selection of the different line segments of stopping profiles as the train approaches a station results in a stopping profile curve as shown in FIG. 2, such that the train will consistently be brought to a precision stop within preselected limits (+ or −1 to 2 feet) within the station in accordance with the stopping profile curve.

The pulses from the pulse generator 2 during motion of the train are also utilized as a source of voltage supply to the pulse detector 13a of the zero speed detector 13. The pulse detector 13a is essentially a pulse stretcher and direct-current amplifier to modify the input signal, such that an output voltage is applied to the slow release relay 13b to cause the contact member 13c thereof to be picked up while the vehicle is in motion. During the stopping procedure, the relay 12p has been dropped-out as previously explained, thereby moving the contact member 12pc to its lower closed position. When the vehicle comes to a stop, the slow release relay 13b hesitates briefly and then drops-out to move the contact member 13c to its lower closed position to thereby complete a circuit from the battery supply 16, wire 66, contact member 14a in its upper closed position, wire 69, contact member 12pc in its lower closed position, wire 85, contact member 13c, and wire 86 to the lower winding 4c of latching relay 4; and also by wire 86 to the lower winding 14tt of the latching reset relay 14 to move the respective contact members 4a and 14a to their respective lower closed positions, thereby returning the entire apparatus to its initial condition ready for initiation of starting, as described hereinbefore. Contact member 4a in its lower closed position switches the operational amplifier 20 of the stop integrator 5 from a capacitive to a resistance feedback mode with a zero potential output. Contact member 14c in its down closed position interrupts the circuitry for energizing the windings 4c and 14tt and completes circuitry from the battery supply 16 and wire 66 to wire 67 and terminal 68. Terminal 68 is connected to a transmitter means 87 shown herein as a box (not described herein, as not essential to an understanding of the invention) which transmits a signal throughout the train to cause the doors to be opened at the completion of the train stop, after which a new cycle of operation may be initiated by receipt of a dispatch signal at terminal 63, as previously described.

It should be noted that movement of contact member 14a to its down closed position removes the battery supply 16 from the brake application circuitry to thereby result in a "lap condition" of braking while the train is stopped in the station. Upon receipt of a dispatch signal at terminal 63, as just mentioned, battery supply 16 is again connected to wire 69 by the contact member 14a at contact 14b, and simultaneously upon receipt of a speed command at terminal 70, with zero actual velocity output potential since the train is stopped, a maximum negative potential is received at terminal 49 (as previously explained) to in turn cause energization of all three relays 12a, 12r and 12p in a manner previously explained, to thereby released the brakes and initiate propulsion to move the train out of a station stop.

I claim:
1. A motion control system for railway vehicles comprising, in combination:
   (a) brake control means,
   (b) propulsion control means,
   (c) means providing a continuous electronic analog signal potential of actual vehicle velocity,
   (d) means providing an electronic analog signal potential of distance of vehicle travel from a predetermined reference point in advance of a station stop,
   (e) means providing an electronic analog signal potential of desired velocity of the vehicle,
   (f) diode-resistor network means arranged in predetermined circuitry form as a function generator means responsive to input thereto of said analog signal potential of distance of vehicle travel from a predetermined reference point in advance of a station stop, and of desired velocity of the vehicle to provide a regulated variable gain output analog signal potential progressively varying and calculated accurately according to a desired velocity at any predetermined distance from said station stop to conform to a desired stopping speed profile,
   (g) means responsive jointly to the electronic analog signal potential of actual vehicle velocity and the last said analog signal potential for providing an analog signal potential of velocity error with respect to the desired stopping profile,
   (h) and means responsive to the analog signal potential of velocity error for selectively controlling said brake control means and said propulsion control means to regulate the velocity of the vehicle during a stopping period into substantial conformity with the stopping speed profile.

2. A motion system for railway vehicles as claimed in claim 1, further characterized by means providing an analog signal potential of braking level in accordance with actual braking effect as effected at the brake rigging to modulate said means supplying an analog signal potential of velocity error.

3. A motion control system for railway vehicles as claimed in claim 1, further characterized in part in that the last named means comprises a plurality of electro-responsive relay means, the windings of which are energized selectively responsively to the output analog signal potential of velocity error and the contact members of which control the supply of operating current to said brake control means and said propulsion control means, and, in part, by addition of
   (a) a relay means for making the supply of operating current available for control by the said contact members of said electro-responsive relay means so long as said speed responsive means continues to supply said analog signal potential of actual velocity and for making the supply of operating current unavailable for control by the contact members of said electro-responsive relay means upon cessation of supply of said analog signal potential of actual velocity by said speed responsive means.

4. A motion control system for railway vehicles comprising in combination:
   (a) brake control means,
   (b) propulsion control means,
   (c) means providing a continuous electronic analog signal potential of actual velocity of the vehicle,
   (d) means providing a continuous analog signal potential of desired velocity of the vehicle,
   (e) comparison means responsive jointly to the analog signal potential of actual velocity of the vehicle and of desired velocity of the vehicle for providing an analog signal potential of velocity error with respect to desired velocity, and
   (f) means responsive to the output analog signal potential of velocity error of the said comparison means for continuously selectively controlling said brake control means and said propulsion control means to continuously regulate the velocity of the vehicle,
   (g) integrator means providing an electronic analog signal potential of distance of vehicle travel from a predetermined reference point in advance of a station stop,
   (h) position reference means partly in the wayside and partly on the vehicle operably responsive to travel of the vehicle past said predetermined reference point to render said integrator means operative, and
   (i) diode-resistor network means arranged in predetermined circuitry form as a function generator means responsive to input thereto of said analog signal potential of distance of vehicle travel from a predetermined reference point in advance of a station stop, and of desired velocity of the vehicle to provide a regulated variable gain output analog signal potential progressively varying and calculated accurately according to a desired velocity at any predetermined distance from said station stop to conform to a desired stopping speed profile.

5. A motion control system for railway vehicles as claimed in claim 4, further characterized in part in that the last named means comprises a plurality of electro-responsive relay means, the windings of which are energized selectively responsively to the output analog signal potential of velocity error and the contact members of which control the supply of operating current to said brake control means and said propulsion control means, and, in part, by addition of
   (a) a relay means for making the supply of operating current available for control by the said contact members of said electro-responsive relay means to long as said speed responsive means continues to supply said analog signal potential of actual velocity and for making the supply of operating current unavailable for control by the contact members of said electro-responsive relay means upon cessation of supply of said analog signal potential of actual velocity by said speed responsive means.

6. A motion control system for railway vehicles as claimed in claim 5, further characterized by vehicle door control means operatively controlled by said relay means.

7. A motion control system for railway vehicles comprising, in combination:
   (a) brake control means,
   (b) propulsion control means,
   (c) speed responsive means providing a continuous electronic analog signal potential of actual velocity of the vehicle,
   (d) speed command means partly on the wayside and partly on the vehicle for providing a first analog signal potential of desired velocity of the vehicle,
   (e) first means operatively responsive to said first analog signal potential of desired velocity to provide a second electronic analog signal potential of desired velocity of the vehicle,
   (f) second means operatively responsive to said electronic analog signal potential of actual velocity for providing an electronic analog signal potential of distance of vehicle travel from a predetermined reference point in advance of a station stop,
   (g) position reference means partly on the wayside and partly on the vehicle operably responsive only to travel of the vehicle past said predetermined reference point to render said second means effective at that time in advance of a station stop and only during that period of time from passage of said reference point until a station stop is completed,
   (h) diode-resistor network means arranged in predetermined circuitry form as a function generator means responsive to input thereto of said analog signal potential of distance of vehicle travel from a predetermined reference point in advance of a station stop, and of desired velocity of the vehicle to provide a regulated variable gain output analog signal potential progressively varying and calculated accurately according to a desired velocity at any predetermined distance from said station stop to conform to a desired stopping speed profile,
   (i) third means effective under one condition prior to vehicle passage of said reference point to be responsive jointly to the said analog signal potential of actual velocity and to the said second analog signal potential of desired velocity to provide an analog signal potential of velocity error; and under a second condition at and following vehicle passage of said reference point to be responsive jointly to the said analog signal potential of actual velocity and to the said third analog signal potential of desired velocity according to a desired speed stopping profile to provide an analog signal potential of velocity error, and
   (j) fourth means responsive to the output analog signal potential of velocity error of said third means for continuously selectively controlling said brake control means and said propulsion control means to continuously regulate the velocity of the vehicle.

8. A motion control system for railway vehicles as claimed in claim 7, further characterized in that said speed responsive means includes an alternating current axle-generator means and a precision pulse generator operatively responsive to the output of said axle-generator means to provide the said analog signal potential of actual velocity of the vehicle.

9. A motion control system for railway vehicles as claimed in claim 7, further characterized in that said second means includes said diode-resistor network and a series-related operational amplifier with a capacitor in parallel with said amplifier to develop the analog signal potential of distance of vehicle travel from said reference point.

10. A motion control system for railway vehicles as claimed in claim 7, further characterized in that said position reference means includes a latching relay means on the vehicle to render said second means effective when the vehicle passes said reference point.

11. A motion control system for railway vehicles as claimed in claim 7, further characterized in that said function generator means includes said diode-resistor feedback network operative jointly with said first means to develop the third analog signal potential of desired velocity according to a desired speed stopping profile.

12. A motion control system for railway vehicles as claimed in claim 7, further characterized in that said third means includes said diode-resistor network and a series-related operational amplifier with a capacitor in parallel with said amplifier to sense velocity error and develop an analog signal potential of velocity error.

13. A motion control system for railway vehicles as claimed in claim 7, further characterized in that said fourth means includes a voltage selective resistor network, a plurality of voltage-responsive amplifiers and a plurality of control relays, said amplifiers being effective to selectively energize said control relays in a manner to selectively complete circuitry to said brake control means and said propulsion control means.

14. A motion control system for railway vehicles as claimed in claim 7, further characterized by a brake level feedback circuitry means providing an analog signal potential of braking level to modify the input and output of sai dthird means in accordance with the braking level attained on the vehicle by said brake control means.

15. A motion control system for railway vehicles as claimed in claim 7 further characterized in part in that said fourth means comprises a plurality of electro-responsive relay means, the windings of which are energized selectively responsively to the output analog signal potential of velocity error and the contact members of which control the supply of operating current to said brake control means and said propulsion control means, and, in part, by addition of
(a) a relay means for making the supply of operating current available for control by the said contact members of said electro-responsive relay means so long as said speed responsive means continues to supply said analog signal potential of actual velocity and for making the supply of operating current unavailable for control by the contact members of said electro-responsive relay means upon cessation of supply of said analog signal potential of actual velocity by said speed responsive means.

16. A motion control system for railway vehicles, as claimed in claim 7, further characterized in part in that said fourth means comprises a plurality of electro-responsive relay means, the windings of which are energized selectively responsively to the output analog signal potential of velocity error and the contact members of which control the supply of operating current to said brake control means and said propulsion control means, and, in part, by addition of
(a) latching relay means operative in response to a dispatch signal to one position for making the supply of operating current available for control by the contact members of said electro-responsive relay means and operative to a different position upon cessation of the supply of said analog signal potential of actual velocity by said speed responsive means consequent upon stopping of the vehicle, for making the supply of operating current unavailable for control by the contact members of said electro-responsive relay means.

17. Apparatus for providing an electronic analog signal potential of distance traveled by a vehicle from a predetermined point, said apparatus comprising:
(a) an alternating current axle-generator means providing signal potential pulsations of a frequency proportional to vehicle velocity,
(b) a precision pulse generator means operably responsive to said signal potential pulsations from said axle-generator means to provide an analog signal potential of actual velocity of the vehicle;
(c) a diode-resistor network supplied by said analog signal potential of actual velocity and a separate negative potential supply,
(d) an operational amplifier,
(e) a capacitor in parallel with said amplifier to form an integration circuit,
(f) position reference means partly on the wayside and partly on the vehicle operably responsive only to travel of the vehicle past a predetermined reference point to serially connect said diode-resistor network and said operational amplifier to measure distance by integrating the velocity output analog signal potential of actual velocity from the said pulse generator to provide an integrated direct current analog signal potential of distance of vehicle travel from the said predetermined reference point.

References Cited

UNITED STATES PATENTS

| | | | |
|---|---|---|---|
| 3,041,448 | 6/1962 | Pascoe et al. | 246—63 |
| 3,218,454 | 11/1965 | Hughson | 246—182 |
| 3,245,728 | 4/1966 | Brooks | 246—182 XR |
| 3,270,199 | 8/1966 | Smith | 246—182 |
| 3,297,867 | 1/1967 | Archibald | 246—184 XR |
| 3,334,224 | 8/1967 | Allen et al. | 246—182 XR |
| 3,363,096 | 1/1968 | Hughson et al. | 246—187 |

FOREIGN PATENTS

| | | |
|---|---|---|
| 972,859 | 10/1964 | Great Britain. |
| 978,559 | 12/1964 | Great Britain. |

OTHER REFERENCES

An article titled "Automatic Regulation of Train Speed," appearing on pp. 184–186 and 189 in the Mar. 5, 1965 issue of The Railway Gazette.

DRAYTON E. HOFFMAN, Primary Examiner

U.S. Cl. X.R.

246—167, 182, 184